United States Patent
Hong et al.

(10) Patent No.: US 6,646,894 B2
(45) Date of Patent: Nov. 11, 2003

(54) SWITCHING MODE POWER SUPPLY

(75) Inventors: Keun-Eui Hong, Bucheon (KR); Won-Sob Lee, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 10/295,172

(22) Filed: Nov. 15, 2002

(65) Prior Publication Data
US 2003/0117813 A1 Jun. 26, 2003

(30) Foreign Application Priority Data
Dec. 21, 2001 (KR) .......................................... 2001-82601

(51) Int. Cl.[7] .............................................. H02M 3/335
(52) U.S. Cl. ................................ 363/21.01; 363/21.16; 363/21.18
(58) Field of Search ................................ 363/20, 21.01, 363/21.12, 21.16, 21.17, 21.18

(56) References Cited

U.S. PATENT DOCUMENTS

| | | | |
|---|---|---|---|
| 5,978,235 A | * 11/1999 | Lampinen | 363/21.16 |
| 6,252,783 B1 | 6/2001 | Huh et al. | 363/21.01 |
| 6,434,030 B1 | * 8/2002 | Rehm et al. | 363/97 |
| 6,515,876 B2 | * 2/2003 | Koike et al. | 363/21.16 |
| 6,532,159 B2 | * 3/2003 | Nishida et al. | 363/21.16 |

* cited by examiner

Primary Examiner—Bao Q. Vu
(74) Attorney, Agent, or Firm—Sidley Austin Brown & Wood LLP

(57) ABSTRACT

Disclosed is a switching mode power supply that includes: a power supply section including a main switch coupled to the primary winding of a transformer, wherein the main switch in normal operation mode performs a switching operation at a predetermined duty, wherein the main switch in standby mode does not perform a switching operation during a first interval and performs a switching operation during a second interval at a first duty, thereby supplying power to the secondary winding of the transformer; a mode discriminator for sensing the reception of an external sync signal at the primary winding of the transformer and generating a signal for operating the main switch in normal operation mode or in standby mode according to whether or not the external sync signal is received; a control voltage generator having a first transistor to which a current corresponding to a signal output from the mode discriminator flows, and a first capacitor connected in parallel to the first transistor; and a switching controller for controlling the main switch to perform a switching operation at the predetermined duty according to a control voltage charged on the first capacitor in normal operation mode and to repeat the switching on/off state in standby mode.

13 Claims, 4 Drawing Sheets

SWITCHING MODE POWER SUPPLY

RELATED APPLICATION

This application claims priority to South Korean Patent Application number 2001-0082601 filed Dec. 21, 2001.

BACKGROUND OF THE INVENTION

The present invention relates to switching mode power supplies (SMPS) also known as switching power supplies. More specifically, the present invention relates to SMPSs that are capable of burst-mode operation, for example, in a standby or reduced power mode.

Previously developed electronic equipment such as televisions, computer monitors, VCRs, etc., commonly have power supply circuits that may operate in two at least modes. Typically, these may be a normal operation mode in which the equipment consumes full power. There may also be a standby mode in which the equipment waits for a signal to enter normal operation mode. While in standby mode, power consumption is minimized.

In response to growing awareness of environmental problems, electronic equipment is increasingly designed to have at least one function to economize on electric energy consumption. Electronic equipment generally uses less electrical power in standby mode than in normal operation mode, but it typically spends more time in standby mode rather as compared with normal operation mode. Some countries have tightened regulatory control over power consumption levels of some types of electronic equipment when operating in standby mode.

A previously developed piece of electronic equipment typically may use an auxiliary power source or may lower at least one power supply circuit output voltage in order to reduce input power level when operating in standby mode. But the use of such techniques to reduce output power may involve an increase in the number of component parts in a product. Thus, the use of such techniques may tend to increase product cost. Moreover, the amount of reduction of the power consumption in standby mode obtainable through such techniques may be insufficient.

In some applications, for example in consumer grade electronic devices, operation over a wide tolerance in input voltage, using cheaper components, and without performance degradation is desirable. In previously developed circuits, it may be necessary to adjust the level shifting circuit or the scaling circuit if it is required to accommodate wide variations in input supply voltage, for example, in a product variant. Alternatively, optimal performance may be compromised by design constraints, such as of multiple product variants.

U.S. Pat. No. 6,252,783 issued to Huh et al. discloses a SMPS that has two distinct operating modes: a normal mode and a standby mode. In the standby mode, normal switching operation is performed for a predetermined time and then stopped for a second predetermined time continually. Standby mode corresponds to low load, and an output smoothing circuit carries the load during the periods that the switching mode circuit is operating. This type of operation is termed "burst mode operation" and conserves energy since switching losses occur intermittently rather than continuously. In the circuits of U.S. Pat. No. 6,252,783, an SMPS has primary and secondary circuits separated by a transformer having primary and secondary windings. The circuits of the SMPS of U.S. Pat. No. 6,252,783 sense a standby mode signal output from a micro-computer in the secondary circuit of a transformer and transfer the result to the primary circuit via an opto-isolating photo-coupler. The photo-coupler provides voltage isolation between circuits associated with the primary and the secondary of the transformer. This use of opto-isolation in an SMPS is, however, relatively expensive. The various reasons for needing such voltage isolation are well known in the art and may have (inter alia) safety, regulatory and EMC (electromagnetic compatibility) aspects.

Accordingly, there is a need for an SMPS that avoids any need for costly components (such as photo-couplers) to signal between primary and secondary transformer circuits while preserving the advantages of the previously developed SMPS designs.

SUMMARY

According to an aspect of the invention, a switching power supply having a normal operation mode and a standby operation mode is provided. Embodiments of the switching power supply may include a power supply section, a mode discriminator, control voltage generator and a switching controller. The switching power supply may comprise a power supply section having a main switch coupled to a primary winding of a transformer. The mode discriminator may be operable to generate a mode signal in response to an external sync signal presented at the primary winding of the transformer. The mode discriminator may determine the choice between operation in normal operation mode versus standby operation mode. The voltage generator may determine the output voltage according to the operating mode. The switching controller may operate the main switch continually in normal mode or in intermittent bursts in standby mode.

In various embodiments, the present invention offers a design capable of providing a superior cost-performance tradeoff across variations in power supply, component tolerance and product application and/or design.

BRIEF DESCRIPTION OF THE DRAWINGS

The accompanying drawings, which are incorporated in and constitute a part of the specification, illustrate an embodiment of the invention, and, together with the description, serve to explain the principles of the invention.

For convenience in description, identical components are given the same reference numbers in the various drawings.

DETAILED DESCRIPTION OF THE PREFERRED EMBODIMENTS

Figure 1:
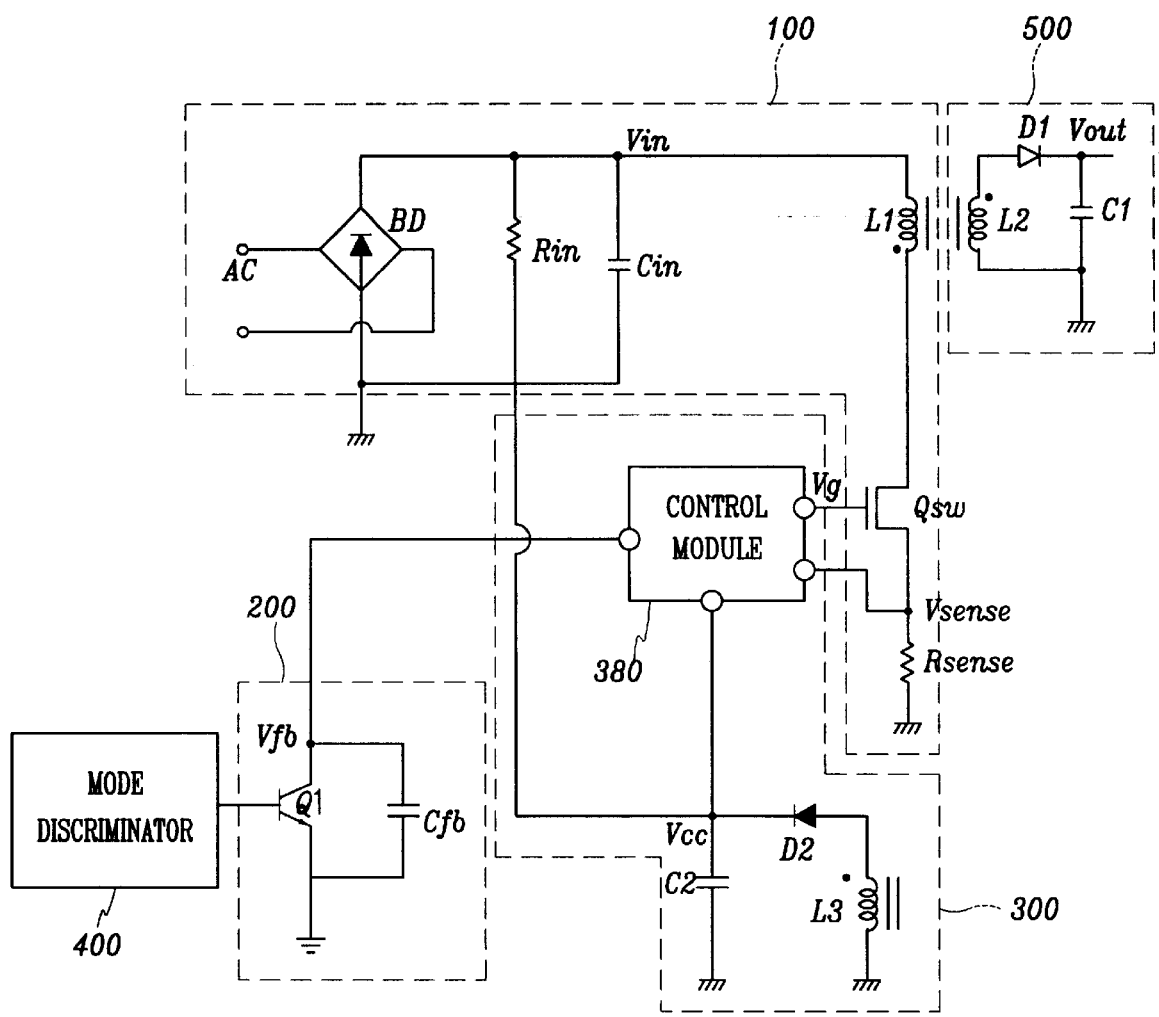
FIG. 1 is a circuit diagram of an SMPS in accordance with an embodiment of the present invention.

In the following description, for purposes of clarity and conciseness of the description, not all of the numerous components shown in the schematics and/or drawings are described. The numerous components are shown in the drawings to provide a person of ordinary skill in the art a thorough, enabling disclosure of the present invention. The operation of many of the components would be understood and apparent to one skilled in the art.

A preferred embodiment of the invention is shown and described below and illustrates an exemplary embodiment of the best mode contemplated by the inventor(s) of carrying out the invention. As will be realized, the embodiment(s) disclosed are capable of modification in various respects, without departing from the scope of the invention. Accordingly, the drawings and description are to be regarded as illustrative in nature and not restrictive in nature.

In various embodiments of the invention, circuits and methods are provided for switching power supplies.

FIG. 1 is a circuit diagram of an SMPS circuit in accordance with an embodiment of the present invention. The SMPS circuit according to the embodiment of the present invention comprises, as shown in FIG. 1, a power supply section 100, a control voltage generator 200, a switching controller 300, a mode discriminator 400, and an output circuit 500.

The power supply section 100 comprises a bridge diode BD for rectifying an AC (alternate current) input; a capacitor $C_{in}$ for smoothing the rectified voltage; a resistance $R_{in}$ connected to a terminal of the capacitor $C_{in}$; a primary winding $L_1$ connected to smoothed input voltage $V_{in}$; and a main switch $Q_{sw}$ connected to the primary winding. The main switch as used in the exemplary embodiment of the present invention is embodied as a switching MOS (metal-oxide semiconductor) transistor. Between the source of the switching MOS transistor (main switch $Q_{sw}$) and ground is connected a sense resistance $R_{sense}$ for developing a sense voltage $V_{sense}$.

The power supply section 100 uses the input voltage $V_{in}$ to drive time-variant current into the primary winding $L_1$ of a transformer according to the duty of the main switch $Q_{sw}$. Thus, in the output circuit 500, a desired output voltage $V_{out}$ is produced.

The output circuit 500 comprises a diode $D_1$ having an anode connected to the secondary winding $L_2$ of the transformer and a capacitor $C_1$ connected between the cathode of the diode $D_1$ and the ground. The capacitor $C_1$ of the output 500 smoothes the voltage sent to the secondary winding of the transformer and applies the smoothed output voltage $V_{out}$ to energize a load (not shown in the figures).

The mode discriminator 400 detects an externally supplied sync signal (not shown in FIG. 1) and controls the current value applied to the base of a transistor $Q_1$ in the control voltage generator 200 according to whether or not the external sync signal is detected. The SMPS of the present invention operates in either normal mode or in standby mode responsive to the level of current in the base of transistor $Q_1$. In the exemplary embodiment of the invention, the externally supplied sync signal may be a train of pulses having a significantly greater 0 Hz component in normal mode as contrasted with standby mode.

The control voltage generator 200 comprises a transistor $Q_1$ having a base receiving the current from the mode discriminator 400 and an emitter connected to the ground and further having a capacitor $C_{fb}$ connected across the emitter and collector of the transistor $Q_1$. A voltage $V_{fb}$ becomes charged onto the capacitor $C_{fb}$ and is used as a control voltage for controlling the switching controller 300 as described below.

The switching controller 300 comprises a control module 380 having input connections that receive the control voltage $V_{fb}$ charged on the capacitor $C_{fb}$, a voltage $V_{cc}$ across the capacitor $C_2$ and a sense voltage $V_{sense}$ for sensing the current flowing through the switching MOS transistor $Q_{sw}$. The control module 380 also has an output connection that supplies a gate voltage $V_g$ that controls the switching operation of the switching MOS transistor $Q_{sw}$. Capacitor $C_{fb}$ is charged by current developed in winding $L_3$ and supplied through diode $D_2$. Winding $L_3$ may be formed as a low power winding in close proximity with, and coupled by mutual inductance to, the primary transformer winding $L_1$. Thus, $L_3$ may be considered to be part of the primary circuit from a ground isolation standpoint.

Figure 2:
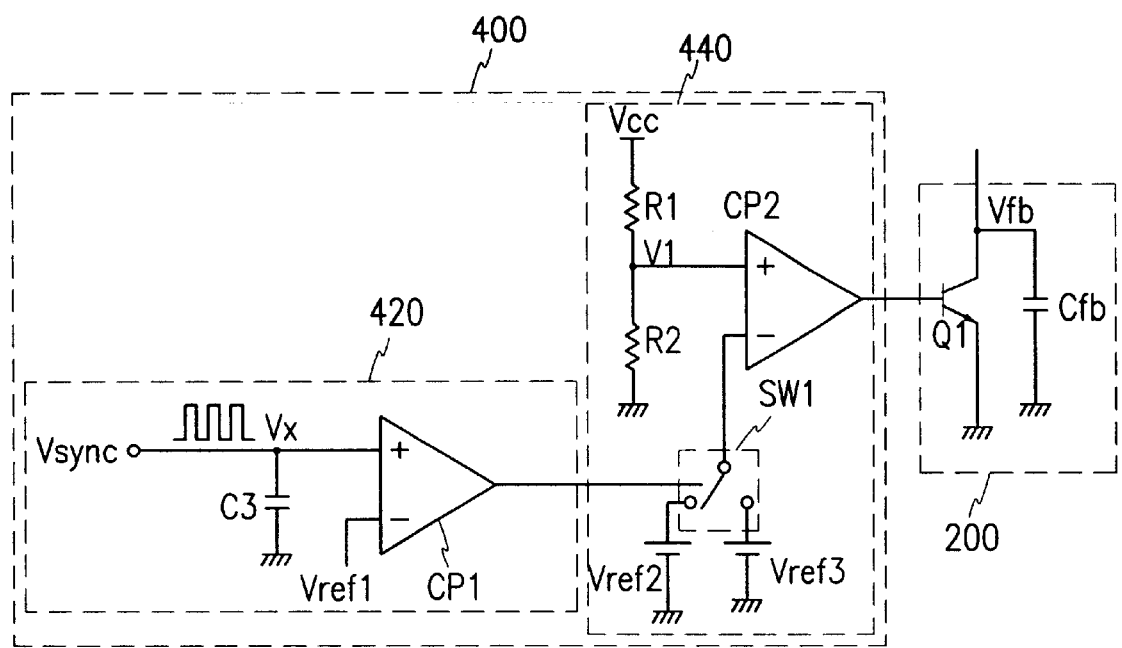
FIG. 2 is a detailed circuit diagram of a mode discriminator in accordance with an embodiment of the present invention.

FIG. 2 is a circuit diagram of a mode discriminator 400 according to the exemplary embodiment of the present invention.

As shown in FIG. 2, the mode discriminator 400 comprises a sync signal detector 420 for detecting the input external sync signal $V_{sync}$ and a control current generator 440 for generating a bias current. The level of bias current is responsive to the output of the sync signal detector 420 and is applied to the base of the transistor $Q_1$ of the control voltage generator 200.

Still referring to FIG. 2, the sync signal detector 420 comprises a capacitor $C_3$ connected between the external sync signal and ground; and a comparator $CP_1$ for comparing a voltage $V_x$ charged on the capacitor $C_3$ with a reference voltage $V_{ref1}$.

The control current generator 440 comprises a switch $SW_1$ which operates to select a reference voltage $V_{ref2}$ or $V_{ref3}$ according to the output signal of the comparator $CP_1$; resistances $R_1$ and $R_2$ connected in series between the source voltage $V_{cc}$ and the ground; and a differential amplifier $CP_2$ for generating an output current responsive to the difference between voltages $V_1$ and the reference voltage ($V_{ref2}$ or $V_{ref3}$) selected by the switch $SW_1$. According to the exemplary embodiment of the present invention, the reference voltage $V_{ref2}$ is higher than the reference voltage $V_{ref3}$ and component values are selected so that $V_1$ is intermediate between the two reference voltages.

Figure 3:
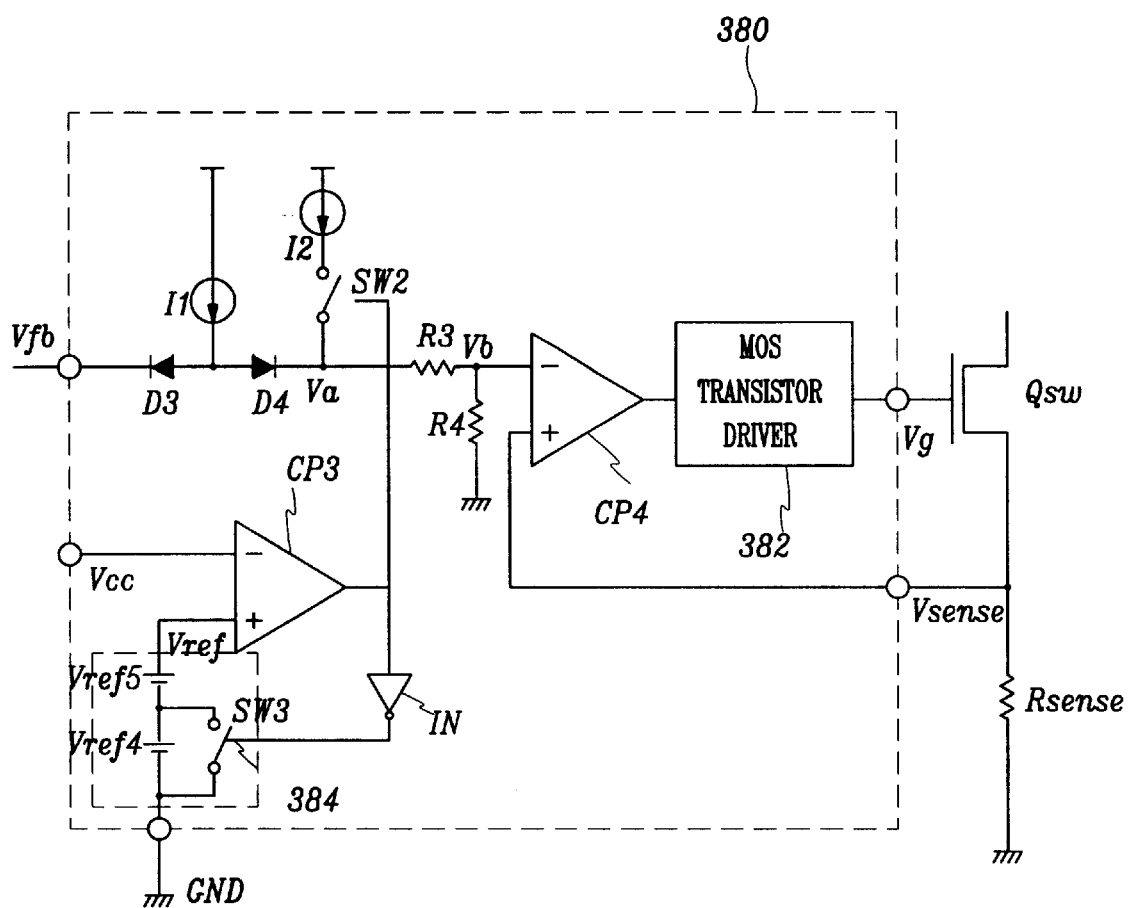
FIG. 3 is a detailed circuit diagram of a control module in accordance with an embodiment of the present invention.

FIG. 3 is a circuit diagram of a control module 380 in accordance with the exemplary embodiment of the present invention.

The control module 380 shown in FIG. 3 comprises current sources $I_1$ and $I_2$, a diode $D_3$ having an anode connected to the current source $I_1$ and a cathode connected to the control voltage $V_{fb}$. The control module 380 further comprises a diode $D_4$ having an anode connected to the current source $I_1$ and a switch $SW_2$ connected between the current source $I_2$ and the cathode of the diode $D_4$.

The control module 380 still further comprises a comparator $CP_3$ having an inverting input and a non-inverting input for receiving the voltage $V_{cc}$ and a voltage $V_{ref}$ from a reference voltage generator 384, respectively. The reference voltage generator 384 comprises reference voltages $V_{ref4}$ and $V_{ref5}$ and a switch $SW_3$ capable of disabling the reference voltage $V_{ref4}$. The output voltage $V_{ref}$ of the reference voltage generator 384 becomes either $V_{ref5}$ or $V_{ref5}+V_{ref4}$ responsive to the state of the switch $SW_3$.

The output of the comparator $CP_3$ is connected to an inverter IN, the output of which is used as a switching control signal for the switch $SW_3$. The output of the comparator $CP_3$ is also used as a switching control signal for the switch $SW_2$.

The control module 380 further comprises a resistance $R_3$ connected to the cathode of the diode $D_4$ and a resistance $R_4$ connected between resistance $R_3$ and ground. The control module 380 still further comprises a comparator $CP_4$ having an inverting input and a non-inverting input for receiving a voltage $V_b$ between the resistances $R_3$ and $R_4$ and the sense voltage $V_{sense}$, respectively; and a MOS driver transistor 382 that receives the output voltage of the comparator $CP_4$. The MOS driver transistor 382 generates a gate voltage $V_g$ as a signal for controlling the switching MOS transistor $Q_{sw}$.

Figure 4:
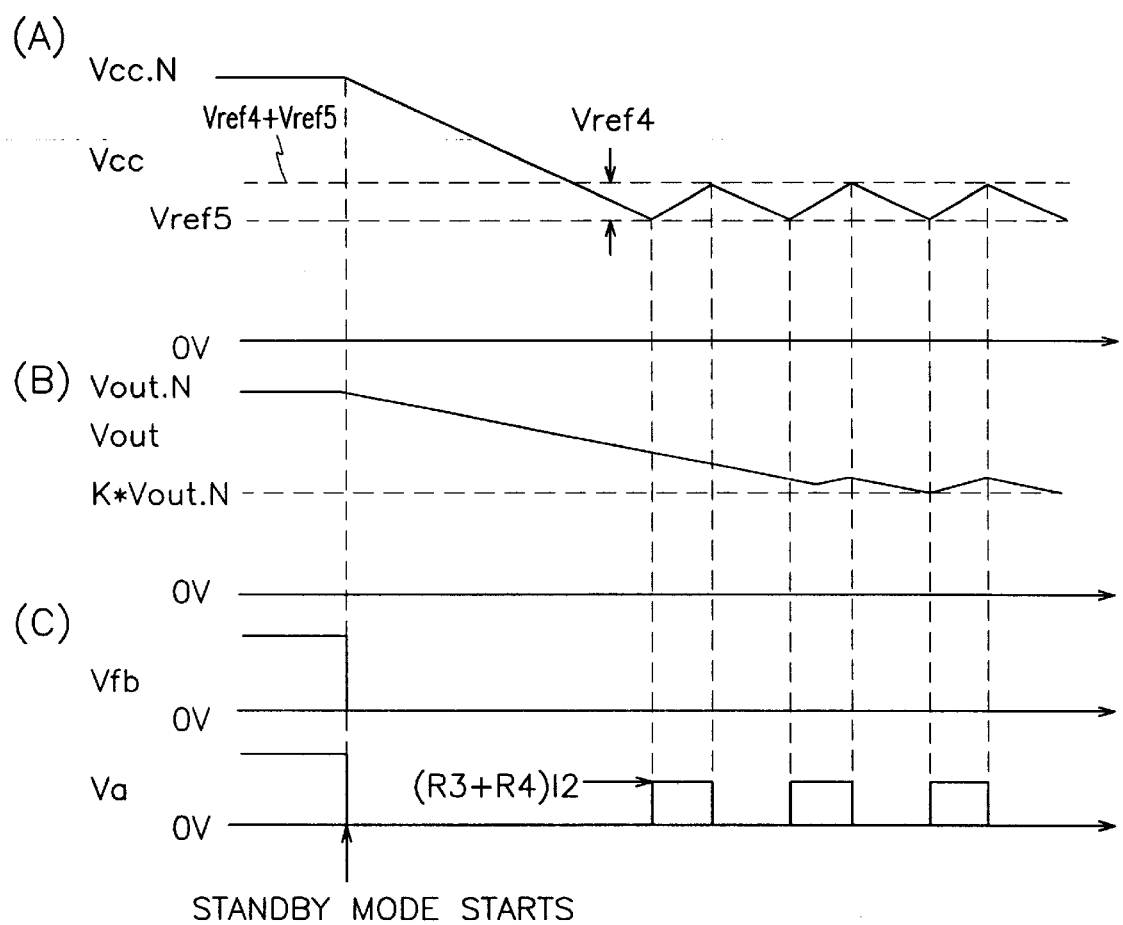
FIG. 4 is a waveform diagram that shows some operating points of circuits such as those shown in FIGS. 1, 2 and 3 in accordance with at least one embodiment of the present invention.

The operation of the embodiment of the present invention will be described in detail below with reference to FIGS. 1 to 4. FIG. 4 illustrates the waveforms of some individual signals of the SMPS according to a particular embodiment of the present invention.

The SMPS is selected to operate in normal mode or standby mode responsive to the input mode signal to the mode discriminator 400. In the exemplary embodiment described, the input mode signal is a train of positive going pulses for normal mode and substantially zero volts (i.e., substantially no signal present) for standby mode. An input mode signal of this type is termed an external sync signal and is designated as $V_{sync}$.

Though the exact form of the input mode signal is not critical, such an external sync signal may be generated without use of circuitry on the secondary side of the SMPS. For example, it may be generated using a pulse generator and controlled by manual users input to a switch of some kind (not critical) to select between normal mode and standby mode. Manual input switches and pulse generators are well known in the art. Embodiments of pulse generators needed for this purpose may have very low power requirements and may be energized by such means as an electrochemical cell or a low power winding on the transformer physically remote and electrically isolated from the main secondary winding. Indeed, in some embodiments, the external sync signal may be produced without manual input by detecting current in the transformer primary circuit. AC (alternating current) in the primary circuit will be much higher in normal mode as compared with standby mode. It is well known in the art to convert power supply currents to pulse trains, for example by high pass filtering and then detecting, such as with a simple diode detector.

By generating the input mode (or external sync) signal in one of the ways described above, or otherwise, it is possible to have primary and secondary circuits floating with respect to each other. Consequently, good voltage isolation of the driven load device from the power supply input is achieved without the use of expensive isolation components such as the opto-isolating photo-transistor and diode devices found in the previously developed solutions.

A description of the operation of the exemplary embodiment of the SMPS in normal operation mode follows:

In normal operation mode, an external sync signal $V_{sync}$ in the form of positive going pulses is applied to sync signal detector 420. Capacitor $C_3$ acts to low-pass filter the external sync signal to a substantially constant voltage that is higher than the reference voltage $V_{ref1}$. Accordingly, the comparator $CP_1$ applies a HIGH signal to the switch $SW_1$, which then selects voltage $V_{ref2}$ as reference voltage $V_{ref}$.

A voltage $V_1$ formed by the resistor dividers $R_1$ and $R_2$ feeds the non-inverting terminal of amplifier $CP_2$ has a value that may be determined from Equation 1. A current having a magnitude responsive to the difference between the voltage $V_1$ and the reference voltage $V_{ref2}$ flows to the base of the transistor $Q_1$.

$$V_1 = \frac{R_2}{R_1 + R_2} V_{cc} \qquad \text{[Equation 1]}$$

Voltage $V_1$ is a little greater than voltage $V_{ref2}$ which is selected by $SW_1$ to be reference $V_{ref}$ in normal operation mode, so little or no current flows into the base of the transistor $Q_1$. Thus, in normal operation mode, transistor $Q_1$ is substantially cut off, so the current source $I_1$ charges capacitor $C_{fb}$ to a predetermined control voltage $V_{fb}$.

Winding $L_3$ continuously generates a relatively high voltage in normal operation mode, so the voltage $V_{cc}$ charged onto the capacitor $C_2$ becomes equal to a value $V_{cc,N}$ that is higher than $V_{ref4} + V_{ref5}$, as shown at reference (A) in FIG. 4. Since the comparator $CP_3$ outputs a LOW voltage, the switch $SW_2$ is turned OFF. And since switch $SW_2$ is OFF in normal operation mode, the voltage $V_a$ is equal to the predetermined control voltage $V_{fb}$. Also, since the comparator $CP_3$ outputs a LOW voltage and the switch $SW_3$ is turned ON so that the output voltage $V_{ref}$ of the reference voltage generator 384 is $V_{ref5}$.

The voltage $V_b$, which is formed by the voltage $V_a$ applied to the resistance divider chain $R_3$ and $R_4$, is fed into the comparator $CP_4$ and compared with the sense voltage $V_{sense}$. Since, under these operating conditions, the current through transistor $Q_1$ is small, substantially all of current $I_1$ flows through the resistance divider chain $R_3$ and $R_4$.

The comparator $CP_4$ outputs the value corresponding to the difference between the two compared voltages to the MOS transistor driver 382. The MOS transistor driver 382 drives the switching MOS transistor $Q_{sw}$ to form a relaxation oscillator at a predetermined frequency and duty cycle corresponding to the output values of the comparator $CP_4$. The MOS transistor driver 382 as used herein may be an IC commercially available. In normal operation mode, switch $SW_2$ remains OFF and the switching MOS transistor $Q_{sw}$ acts continuously in its well-known switching operation.

A description of the operation of the exemplary embodiment of the SMPS in standby operation mode follows:

When electronic equipment operates load in standby mode under user control, there is no external sync signal $V_{sync}$ of pulses applied to the input of mode discriminator 400. The voltage on the capacitor $C_3$ is approximately ground voltage and is smaller than the reference voltage $V_{ref1}$. Accordingly, the comparator $CP_1$ applies a LOW signal to the switch $SW_1$, which then selects a reference voltage $V_{ref3}$ (where $V_{ref3} < V_{ref2}$).

Because the reference voltage $V_{ref3}$ is lower than the reference voltage $V_{ref2}$ in the embodiment of the present invention, a current much higher than in normal operation mode flows to the base of the transistor $Q_1$ in standby mode. Thus transistor $Q_1$ is substantially turned on and substantially all of the available current from the current source $I_1$ is sunk through transistor $Q_1$. As shown in (C) of FIG. 4, the control voltage $V_{fb}$ is close to zero. Thus, the voltage $V_a$ is also zero, as shown in (C) of FIG. 4, whenever switch $SW_2$ is OFF.

Whenever the voltage $V_a$ is zero, the switching MOS transistor $Q_{sw}$ is cut off and does not oscillate. Under this condition, any voltage $V_{cc}$ charged on the capacitor $C_2$ leaks slowly away, as shown in (A) of FIG. 4. Moreover, the output voltage $V_{out}$ also decreases gradually as the small standby load is supplied with current, as shown in (B) of FIG. 4. The decreasing slopes of the voltages $V_{cc}$ and $V_{out}$ are determined by the capacitance-resistance time constants of the circuits associated with the capacitors $C_2$ and $C_1$, and the slopes are typically unequal, as depicted in FIG. 4.

When the voltage $V_{cc}$ has decreased to a value that it is lower than the reference voltage $V_{ref5}$, the comparator $CP_3$ outputs a HIGH voltage, and the switches $SW_3$ and $SW_2$ are turned off and on, respectively. The output voltage of the reference voltage generator 384 is increased to $V_{ref4} + V_{ref5}$ and the current from the current source $I_2$ is supplied to the resistances $R_3$ and $R_4$. With the switch $SW_2$ turned ON, the voltage $V_a$ becomes constant, as expressed by Equation 2.
[Equation 2]

$$V_a = (R_3 + R_4) I_2$$

The voltage $V_a$ in Equation 2 is divided by the resistance divider chain formed by $R_3$ and $R_4$ to form the divided voltage $V_b$ which feeds comparator $CP_4$. Together with $V_{sense}$, this controls the MOS transistor driver 382 to initiate another oscillating switching operation of the switching MOS transistor $Q_{sw}$. However, because the voltage $V_a$ is constant while the switch $SW_2$ is ON, oscillation of the transistor $Q_{sw}$ is continuous so long as it remains turned ON.

As the switching MOS transistor $Q_{sw}$ continues to oscillate, the voltage $V_{cc}$ charged on the capacitor $C_2$ gradually increases to a voltage higher than $V_{ref4}+V_{ref5}$, as shown in (A) of FIG. 4. When this occurs, switches $SW_3$ and $SW_2$ become turned OFF, so oscillation ceases and voltage $V_{cc}$ decreases again, repeating the above-stated procedures.

In consequence, when operating in standby mode, the switching MOS transistor $Q_{sw}$ performs a burst mode operation alternately in an oscillating state and then in a quiescent state with a predetermined periodicity. Thus, the switching MOS transistor $Q_{sw}$ performs a switching operation only during a defined period in standby mode and thereby reduces any switching losses when operating in standby mode. In particular, the switching loss in standby mode can be greatly reduced by selecting the winding ratio of the transformer, etc., to make the time constant associated with voltage $V_{cc}$ decreasing (and hence with the switching MOS transistor being in the quiescent state) longer than the time constant associated with voltage $V_{cc}$ increasing from $V_{ref5}$ to $V_{ref4}+V_{ref5}$ (i.e., with the switching MOS transistor is in the oscillating state). Under these conditions, the switching MOS transistor $Q_{sw}$ oscillates for a relatively short time and remains quiescent for a relatively long time.

According to the exemplary embodiment of the present invention, the control voltage $V_{fb}$ is nearly zero in standby mode, as shown in (C) of FIG. 4, and the voltage $V_a$ is determined only by the state of the switch $SW_2$ and not by the control voltage $V_{fb}$. Thus, the oscillating/quiescent intervals of the switching MOS transistor $Q_{sw}$ in standby mode are repeated with a constant cycle time.

According to the exemplary embodiment of the present invention, the voltage $V_{cc}$ is controlled to be between the voltage $V_{ref5}$ and $V_{ref4}+V_{ref5}$, as shown at (A) in FIG. 4, each of which is lower than the voltage $V_{cc,N}$ in normal operation mode. Consequently, the output voltage $V_{out}$ in standby mode is also a lower voltage than in normal operation mode, as shown at (C) in FIG. 4. More specifically, when the ratio of the voltage value $V_{cc,N}$ of the voltage $V_{cc}$ in normal operation mode to the minimum value $V_{ref5}$ in standby mode is K and the value of the output voltage $V_{out}$ in normal operation mode is $V_{out,N}$, the minimum value of the output voltage $V_{out}$ is $KV_{out,N}$, as shown at (B) in FIG. 4.

As shown at (A) and (B) in FIG. 4, the voltage $V_{out}$ drops continuously even in the increasing interval of the voltage $V_{cc}$ for a period of time at the beginning of operation in standby mode. This is because the voltage $V_{cc}$ is different in the decreasing slope from the voltage $V_{out}$. The reason for this difference in the decreasing slope is the difference in the time constants formed by capacitances of capacitors $C_1$ and $C_2$ and their respective load currents.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, although detected with capacitors and comparators in the embodiment of the present invention, the external sync signal may be detected using other circuits.

As described above, when no external sync signal received at the mode discriminator which forms part of the circuitry associated with the transformer primary winding, the SMPS of the present invention is directed to operate in standby mode. When operating in standby mode, it performs an oscillatory switching operation for a predetermined time and then stops oscillating for another (typically longer) predetermined time, thereby reducing a switching loss and hence average input power consumption. Accordingly, the SMPS generates a burst mode in the circuit associated with the secondary winding without using a photo coupler, thus reducing the circuit cost as compared with the previously developed solutions.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A switching power supply having a normal operation mode and a standby operation mode, the switching power supply comprising:

a power supply section having a main switch coupled to a primary winding of a transformer,
wherein in normal operation mode the main switch is operable to perform a switching operation at a fixed frequency,
wherein in standby operation mode the main switch is operable to inhibit the switching operation during a first interval and to perform the switching operation during a second interval, and
wherein in standby operation mode the main switch is further operable to repeat the first and second intervals periodically at a fixed duty cycle, and
wherein the switching operation energizes a secondary winding of the transformer;

a mode discriminator operable to generate a mode signal in response to an external sync signal presented at the primary winding of the transformer and further operable to enter an operation mode in response to the mode signal, the operation mode being selected from a list consisting of the normal operation mode and the standby operation;

a control voltage generator having
a first transistor operable to conduct a current having a magnitude responsive to the mode signal, and
and a first capacitor connected in parallel with a pair of current terminals of the first transistor and a switching controller operable to control the main switch to perform the switching operation at the fixed duty cycle responsive to a control voltage on the first capacitor in normal operation mode and further operable to perform the repeating.

2. The switching power supply of claim 1, wherein the mode discriminator comprises:

a sync signal detector operable to detect the external sync signal; and
a control current generator operable to generate a current responsive to an output of the sync signal detector and further operable to apply the current to a base of the first transistor.

3. The switching power supply of claim 2, wherein the sync signal detector comprises:

a second capacitor having a first terminal connected to receive the external sync signal and a second terminal connected to ground; and
a first comparator operable to compare a voltage across the second capacitor with a first reference voltage.

4. The switching power supply according to claim 2 or claim 3, wherein the control current generator comprises:

a first switch operable to select a second reference voltage or a third reference voltage responsive to the output signal of the sync signal detector; and
an amplifier operable to generate an amplified voltage by amplifying a difference between a first voltage proportionate to a detected voltage and a voltage selected by the first switch and further operable to impress the amplified voltage difference upon the base of the first transistor.

5. The switching power supply of claim 4, wherein
the first switch is operable to select the second reference voltage in response to a reception of the external sync signal, and further operable to select the third reference voltage in response to a detected absence of the external sync signal, wherein the third reference voltage is lower than the second reference voltage.

6. The switching power supply of claim 4, wherein
the first voltage is formed by a first and a second resistance connected to form a voltage divider chain between the detected voltage and ground.

7. The switching power supply according to claim 1, 2, or 3, wherein the switching controller comprises:
a switch driver operable to control the main switch and the switching operation according to a switching control signal; and
a switching control signal generator operable to generate the switching control signal operable in normal operation mode to control the main switch to perform the switching operation at the fixed frequency responsive to the control voltage across the first capacitor and operable in standby operation mode to perform the repeating of the first and second intervals.

8. The switching power supply of claim 7, wherein the switching control signal generator comprises:
a first diode having an anode connected to the primary winding of the transformer;
a third capacitor connected between a cathode of the first diode and further connected to ground;
first and second current sources;
a second diode having an anode connected to the first current source and further having a cathode connected to the first capacitor of the control voltage generator;
a second switch connected to the second current source, the second switch being operable to close in response to a second voltage on the third capacitor being lower than a fourth reference voltage, the second switch being further operable to open in response to the second voltage being lower than the fourth reference voltage or being higher than a fifth reference voltage;
a third diode having an anode and a cathode connected to the first current source and the second switch, respectively; and
first and second resistances connected between the cathode of the third diode and ground.

9. The switching power supply of claim 8, wherein the switching control signal generator further comprises:
a reference voltage generator comprising sixth and seventh reference voltages, and a third switch connected in parallel with the seventh reference voltage, the reference voltage generator being operable to output a generated output voltage response to a state of the third switch; and
a second comparator operable to compare the second voltage with the generated output voltage, the second comparator further operable to output a comparator voltage coupled to the second and third switches, wherein the second and third switches are open and closed, respectively, responsive to the second voltage being higher than the generated output voltage, and wherein the second and third switches are closed and open, respectively, responsive to the second voltage being lower than the generated output voltage.

10. The switching power supply of claim 9, wherein the main switch is a switching MOS transistor.

11. The switching power supply of claim 10, wherein the switching controller comprises:
a third comparator operable to compare for comparing a voltage present between the first and second resistances with a sense voltage proportionate to a current flowing through a source of the switching MOS transistor; and
a MOS transistor driver operable to generate a gate voltage at a gate of the switching MOS transistor responsive to an output of the third comparator.

12. A switching power supply comprising
a secondary circuit energized by a secondary winding of a transformer; and
a primary circuit comprising
a power supply section operable to perform oscillatory switching whenever the switching power supply is in a normal operation mode, and
further operable to perform periodic bursts of oscillatory switching whenever the switching power supply is in a standby operation mode, and
further operable to energize to a primary winding of the transformer; and
a mode discriminator operable to generate a mode control signal in response to an external sync signal, and further operable to control the switching power supply into a mode selected from a list consisting of the normal operating mode and the standby operating mode.

13. The switching power supply of claim 12 further comprising:
a control voltage generator operable to generate a control voltage in response to the mode control signal, the control voltage having a first value whenever the switching power supply is in the normal operating mode and a second value whenever the switching power supply is in the standby operating mode; and
a switching controller operable to control the power supply section to energize the primary winding at a power level selected from a list consisting of a first power level and a second power level responsive to the control voltage.

* * * * *